Patented Oct. 30, 1928.

1,689,577

UNITED STATES PATENT OFFICE.

FREDERICK M. BECKET, OF NEW YORK, N. Y., ASSIGNOR TO OXWELD ACETYLENE COMPANY, A CORPORATION OF WEST VIRGINIA.

WELDING ROD.

No Drawing.  Application filed March 30, 1926.  Serial No. 98,555.

The invention relates to processes wherein metal is fused by the electric arc or the blowpipe, the fused metal being deposited for the purpose of welding, filling, coating, or the like. The invention is concerned particularly with the composition of the metal added in such operations.

The compositions comprised within the invention are ferrous alloys containing manganese, silicon, carbon and in some instances nickel. The presence of other chemical elements which do not adversely affect the alloys for the use under discussion is of course not precluded.

In the choice of a composition to be used as a material for welding rods a multiplicity of factors must be taken into consideration. The merit of a welding rod depends to a large degree upon the tensile strength of the metal which can be deposited from it, but this test is by no means the only one to be passed. It is usually required that the weld metal shall display a certain degree of ductility. Tensile strength can of course be expressed quantitatively, and the usual elongation test gives, if not an exact measure of ductility, at least a very valuable indication. There are other important factors however for which there are only qualitative standards. One of these is the degree of refinement of the grain structure. While a coarse-grained weld metal may exhibit a high tensile strength, it is known that a fine-grained structure is desirable, and that it will afford better resistance to continued alternating stresses. Another important property of a welding rod for which it is scarcely possible to give any quantitative expression is its behavior during the welding operation. It is this which largely determines the speed with which welding can be accomplished, the degree of skill which the welder must possess, and the extent to which the quality of the work will suffer as a result of any lack of care or skill on the part of the welder. The compositions to be described and claimed herein have been developed with all the foregoing considerations in view, in an attempt to secure a proper balance among them.

The compositions of the invention contain manganese in excess of about 1.0% and may contain as high as 4.0%. The silicon content is preferably less than 0.3% and above 0.10%. It may, however, be higher.

When it is desired that the deposited metal shall exhibit considerable ductility the carbon content preferably does not exceed 0.25%. However, the increased manganese content of compositions falling within the invention obviates to some extent the difficulties usually encountered when welding with rods of considerable carbon content, and carbon percentages higher than 0.25% are by no means precluded. The carbon may be increased to as much as 0.75%, especially in those cases where it is expedient to sacrifice ductility in the deposited metal for the sake of securing greater hardness therein, as where the operation is one of producing a surface highly resistant to wear.

The compositions described above are improved in some instances by the addition of nickel. The nickel content may vary through a wide range, from 0.2% to 4.0%. The principal effect of the lower nickel contents is one of grain refinement, while more nickel gives a considerable increase in tensile strength. Nickel also tends to increase ductility. The elevated manganese content of the compositions has the valuable effect of mitigating the difficulties which otherwise would result from the incorporation of a high nickel content.

Compositions preferred for many purposes contain manganese 1.25% to 2.0%, silicon 0.1% to 0.3%, and carbon 0.05% to 0.25%, without nickel or with nickel between 0.2% and 1.0%.

I claim:

1. A welding rod consisting of an iron alloy containing manganese 1.0% to 4.0%; nickel 0.2% to 4.0%; and silicon 0.1% to 0.3%.

2. A welding rod consisting of an iron alloy containing manganese 1.25% to 2.0%; nickel 0.2% to 1.0%; and silicon 0.1% to 0.3%.

3. A welding rod consisting of an iron alloy containing manganese 1.0% to 4.0%; nickel 0.2% to 4.0%; and silicon upward of 0.1%.

In testimony whereof, I affix my signature.

FREDERICK M. BECKET.